Patented Sept. 22, 1953

2,653,097

UNITED STATES PATENT OFFICE 2,653,097

PUFFED CORN AND METHOD OF MAKING SAME

John M. Baer, Chicago, Ill., assignor to Guardite Corporation, a corporation of Delaware No Drawing. Application June 12, 1953, Serial No. 361,412

18 Claims. (Cl. 99—82)

1

This invention relates to a puffed cereal and a method of preparing same, and particularly to puffed corn and corn in the form of grits.

The present application is a continuation-in-part of my copending application, Serial No. 296,963, filed July 2, 1952, now abandoned, which in turn is a continuation-in-part of my applications, Serial No. 40,630, filed July 24, 1948, now abandoned, and copending Serial No. 189,679, filed October 11, 1950, now abandoned. My application Serial No. 189,679, filed October 11, 1950, was a continuation-in-part of my following applications: Serial No. 34,821, now abandoned; Serial No. 34,822, now abandoned; and Serial No. 34,823, now abandoned, all filed July 23, 1948; Serial No. 23,869, filed April 28, 1948, now abandoned; Serial No. 38,179, filed July 10, 1948, now abandoned; and Serial No. 40,630, filed July 24, 1948, now abandoned.

Reference is had to the related cases of John M. Baer and Frank B. Doyle, Serial No. 62,984, filed December 1, 1948; Allison and Carman, Serial No. 161,744, filed May 12, 1950, now abandoned; Carman and Allison, Serial No. 259,313, filed November 30, 1951, now abandoned; and Carman and Allison, Serial No. 275,458, filed March 7, 1952, now abandoned.

The problem of puffing organic cellular material such as corn or corn in the form of grits involves a large number of interlocking variables. The corn grit cells are such as will trap expanding gas and thus provide the pressure differential necessary for puffing. A sudden drop in pressure must be provided of such amount to produce the pressure difference necessary not only to expand the cell walls but to do so in spite of the leakage that necessarily occurs. On the other hand, the pressure difference must be great enough to exceed the elastic limit of the corn grits before puffing has occurred. The expansibility of the cell wall normally depends upon the moisture content of the the product, the condition of that moisture as to being free or combined, the temperature of the article and its chemical condition, particularly as to whether it is cooked or uncooked.

Likewise, there must not only be the pressure difference required to institute puffing, but there must be a volumetric increase of the gases involved sufficient to maintain it.

I have now found that another factor involved, which has hitherto been completely overlooked but the accomplishment of which is inherent in the operation described in my previous applications referred to, is that once the corn grits have been puffed, the puffed condition must be maintained even after the pressure difference has been removed. One of the difficulties encountered in many instances of puffing in the prior art was that the corn grits could be puffed, but after puffing would collapse because of the weakened condition of the walls following the leakage out of the gas which produced puffing. This was particularly true if, after puffing, the pressure outside of the puffed corn grits was increased.

I have now found that by suddenly cooling and dehydrating the product so that its final temperature is below 150° F. and preferably well below 100° F.—as for example, from 32° F. or lower up to, say, 100° F., that the cell walls of the product on puffing are cold set so that on standing or on the application of pressure, even of a greatly increased amount, collapse does not occur.

These results are obtained automatically by following the procedures already outlined in my previous applications. In these procedures, the following points are important:

1. Substantially all of the air should be removed from the product and replaced by an atmosphere of steam prior to puffing.

2. The product should be cooked or moistened by steam or otherwise, preferably by the addition of substantially air-free steam at higher pressure and temperature until the condition of the material is proper for puffing and its moisture content is within the desired range. The use of the process permits the introduction of substantially more moisture than was permissible under the old processes.

3. It is preferred that the sudden release of pressure be into a maintained vacuum zone which is initially below 8 inches of mercury absolute. The conditions of the resulting explosion should be such as to cause cold setting of the puffed corn grits. This means that in actual practice, employing commercially practicable vacuum equipment, the pressure may ride up somewhat during the puffing step. It is preferred to continue evacuation of the vacuum zone during the puffing step so as to cause cold setting of the puffed corn grits. The expansion of air-free steam into a vacuum of 4 inches of mercury absolute will automatically reduce the temperature of the product to approximately 125° F. Reduction of the pressure to 2 inches reduces the temperature to approximately 100° F. Reduction to 1 inch reduces it to about 79° F. and reduction to 0.2 inch reduces it to approximately 34° F.

Furthermore, by puffing into a maintained vacuum, it is possible to obtain a greater temperature drop in number of degrees between the maximum and minimum than was ordinarily obtainable heretofore. The result of this greater temperature drop was to permit the evaporation of more water from the product by boiling into steam. This boiling not only maintained the pressure difference for puffing, but the removal of the water helped to cold set the cell walls by reducing plasticity and elasticity. The combination of the moisture reduction plus chilling, particularly below 100° F., has produced results not heretofore obtainable.

In a vacuum process, this reduction of temperature is of particular significance, since the lower the vacuum used the greater is the increase in pressure after the completion of the puffing operation when the corn grits are taken back into the atmosphere. If it were not for the cooling and drying effects, many products would not be able to maintain their puffed condition when the pressure is increased, for example from 2 inches absolute to 30 inches absolute—an increase fifteenfold.

The removal of the air from inside the corn grit grains in the first instance has a number of advantages. In the first place, the oxygen of the air has a deleterious effect on the corn grit grains, particularly when they are heated. Secondly, the removal of non-condensable gases increases the permeability of the corn grit grains to heat and to steam so that heating will occur uniformly and the steam will penetrate equally to all portions of the corn grit grains.

Thus, when it comes to introducing steam for increasing the moisture content of the product and for cooking it to the necessary chemical and physical conditions, the fact that air is not present inside the corn grit grains produces a rapidity and uniformity of steaming and cooking not otherwise possible. Because of this greater uniformity and speed, it is possible to go to higher temperatures and pressures than would otherwise be possible. Normally, however, it permits the use of lower temperatures and pressures than otherwise required.

The Doyle Patent, No. 2,627,221, which issued February 3, 1953, shows a puffing apparatus particularly suitable for carrying out the processes herein described. In such an apparatus a steaming chamber is provided within which the product may be placed. This steaming chamber is connected by a triggered door to an expansion chamber. The expansion chamber is preferably kept at a very low pressure, means being provided to maintain a low pressure during the puffing. The steaming chamber is provided with evacuating means, steaming means, and usually with a purge line through which non-condensable gases can be eliminated as well as some condensed steam which is developed during steaming.

As an example of the process, corn grits were introduced to the steaming chamber. Air and other non-condensable gases were removed from the corn grit grains by reducing the pressure in the steaming chamber to about 0.2 inch of mercury absolute while withdrawing the generated steam, the corn grits being at a temperature of not less than about 40° F. Saturated steam was then introduced and the pressure increased to 100 pounds per square inch gauge in 5 minutes to substantially completely cook the material without loss of cellular identity. The corn grits were then fired into the expansion chamber which in this instance was at a pressure of 0.2 inch of mercury absolute. This firing is done by suddenly releasing the triggered door of the expansion chamber and the resulting explosion ejects the corn grits into the expansion chamber.

The actual values of the variables in the cooking-puffing cycles of this method depend upon the condition and type of corn grits being used, as well as the degree of puffing desired.

The corn grit grains in their normal dry state may be employed without moistening. However, in some instances, it may be desired to supply flavor, and/or moistening, and/or nutritional values to the grain, prior to, during, or after puffing. This may be done by the use of a liquid carrier, such as water under high temperature and pressure which is exploded into the vessel maintaining the product under high vacuum in an atmosphere of steam. By using water under a pressure and temperature corresponding to that, of say, 100 pounds gauge of steam, the particles may be exploded into a fine mist which will penetrate the grains, particularly after they have been puffed. In this way moisture, sugar, salt, certain vitamins, and nutritional salts may be supplied to the corn grits with or without other flavoring agents. This may be done immediately following the initial evacuation (i. e., during cooking) or immediately following the puffing. It is less economical to do it at some intermediate stage.

The corn grits should be thoroughly cooked for desirable puffing. I have found that cooking at from about 70 to 100 pounds steam pressure gauge for a period of from about 1 to 11 minutes produces satisfactory results. Following cooking, the steam pressure was adjusted to from about 60 to 100 pounds gauge, after which the pressure was then immediately reduced to subatmospheric, preferably below 8 inches of mercury absolute and particularly to about 0.2 inch of mercury absolute. This was done by opening the triggered door of the puffing apparatus and firing the corn grits into the expansion chamber. The pressure within the expansion chamber was maintained at a low point by continuing the evacuation during the puffing and normally the pressure in that chamber was not permitted to exceed 4 inches of mercury absolute and preferably not permitted to exceed 2 inches of mercury absolute. In some instances, however, I have operated successfully with the pressure in the expansion chamber following the explosion riding up to as high as 4 to 8 inches of mercury absolute as measured on a standard mercury manometer, but in most instances the pressure was reduced below 4 inches of mercury absolute within a few minutes and before reimposition of atmospheric pressure.

The resulting vacuum puffed corn grit has a volume of from about 6 to 10 times the original grit as determined by cup weights. Put conversely, the specific gravity as determined from cup weight is from about 10% to 16⅔% of the specific gravity of the original corn grit particles. The shape of the original corn grit is maintained, although greatly enlarged. On cross-section, the vacuum puffed corn grit has a substantially pure white interior and the interior cells are apparently uniformly expanded, there being but a few small cavities present. The outer surface surrounding the interior portion is comprised of a thin layer having many minute cavities substantially uniformly distributed therethrough. This outer surface is not case hardened and is substantially free of any surface splitting.

Examples of applying the method of this invention are:

Example 1

No. 4/5 corn grits (20 pounds) were placed in the steam chamber and the pressure reduced to about 0.2 inch of mercury absolute for 2 minutes, the grits being at a temperature of not less than 40° F., to remove substantially all of the non-condensable gases. The grits were next steamed to a pressure of 100 pounds per square inch gauge in 5 minutes accompanied by continual purging of the steam, and then fired into the expansion chamber which was at a pressure of 0.2 inch of mercury absolute. Evacuation of the expansion chamber was continued during the puff until the grits were cold set.

Example 2

No. 4/5 corn grits (20 pounds) were treated in the same manner as in Example 1, except that in the cooking and puffing cycles the grits were steamed to 100 pounds for 3½ minutes, and then fired into the expansion chamber.

Example 3

No. 4/5 corn grits (20 pounds) were treated in the same manner as in Example 1, except that in the cooking and puffing cycles, they were steamed to 90 pounds per square inch gauge in 2½ minutes and then fired into the expansion chamber.

Example 4

No. 4/5 corn grits (20 pounds) were treated in the same manner as in Example 1, except that in the cooking and puffing cycles they were steamed to 95 pounds per square inch gauge in 2 minutes 15 seconds, held there for 1 minute, the steam pressure quickly reduced to 60 pounds per square inch gauge, and then the grits were fired into the expansion chamber.

Example 5

No. 4/5 corn grits (20 pounds) were treated in the same manner as in Example 1, except that in the cooking and puffing cycles they were steamed to 95 pounds per square inch gauge in 127 seconds, held there for 1 minute, the steam pressure reduced quickly to 60 pounds per square inch gauge, and then the grits were fired into the expansion chamber.

Example 6

No. 4/5 corn grits (20 pounds) were treated in the same manner as in Example 1, except that in the cooking and puffing cycles they were steamed quickly to 95 pounds per square inch gauge, held there for 1 minute, the steam pressure was quickly reduced to 60 pounds per square inch gauge, and then the grits were fired into the expansion chamber.

Example 7

No. 4/5 corn grits (5 pounds) were treated in the same manner as in Example 1, except that in the cooking and puffing cycles they were rapidly steamed to 95 pounds per square inch gauge, held there for 1 minute, the steam pressure was quickly reduced to 60 pounds per square inch gauge, and then the grits were fired into the expansion chamber.

Example 8

No. 4/5 corn grits (20 pounds) were treated in the same manner as in Example 1, except that in the cooking and puffing cycles they were steamed to 75 pounds per square inch gauge in 4 minutes, held there for 1 minute, the steam pressure was quickly reduced to 70 pounds per square inch gauge, and then the grits were fired into the expansion chamber.

Example 9

No. 4/5 corn grits (20 pounds) were treated in the same manner as in Example 1, except that in the cooking and puffing cycles they were steamed to 80 pounds per square inch gauge in 4 minutes, held there for 2 minutes, and then the grits were fired into the expansion chamber.

Example 10

No. 4/5 corn grits (20 pounds) were treated in the same manner as in Example 1, except that in the cooking and puffing cycles they were steamed to 80 pounds per square inch gauge in 4 minutes, held there for 4 minutes, the steam pressure was quickly increased to 100 pounds per square inch gauge, and then the grits were fired into the expansion chamber.

Example 11

No. 4/5 corn grits (20 pounds) were treated in the same manner as in Example 1, except that in the cooking and puffing cycles they were rapidly steamed to 75 pounds per square inch gauge, held there for 8 minutes, and then the grits were fired into the expansion chamber.

Example 12

No. 4/5 corn grits (20 pounds) were treated in the same manner as in Example 1, except that in the cooking and puffing cycles they were steamed to 70 pounds per square inch gauge in 4 minutes, held there for 7 minutes, and then the grits were fired into the expansion chamber.

Example 13

No. 8/10 corn grits (20 pounds) were treated in the same manner as in Example 1, except that in the cooking and puffing cycles they were steamed to 95 pounds per square inch gauge in 1 minute 55 seconds, held there for 1 minute, the steam pressure was quickly reduced to 60 pounds per square inch gauge, and then the grits were fired into the expansion chamber.

Example 14

No. 8/10 corn grits (20 pounds) were treated in the same manner as in Example 1, except that in the cooking and puffing cycles they were steamed to 95 pounds per square inch gauge in 140 seconds, held there for 1 minute, the steam pressure was quickly reduced to 60 pounds per square inch gauge, and then the grits were fired into the expansion chamber.

Example 15

No. 8/10 corn grits (20 pounds) were treated in the same manner as in Example 1, except that in the cooking and puffing cycles they were rapidly steamed to 95 pounds per square inch gauge, held there for 1 minute, the steam pressure was quickly reduced to 60 pounds per square inch gauge, and then the grits were fired into the expansion chamber.

Example 16

No. 8/10 corn grits (5 pounds) were treated in the same manner as in Example 1, except that in the cooking and puffing cycles they were rapidly steamed to 95 pounds per square inch gauge, held there for 1 minute, the steam pressure quickly reduced to 60 pounds per square inch gauge, and then the grits were fired into the expansion chamber.

*Example 17*

No. 8/10 corn grits (20 pounds) were treated in the same manner as in Example 1, except that in the cooking and puffing cycles they were steamed to 75 pounds per square inch gauge in 4 minutes, held there for 1 minute, the steam pressure was quickly reduced to 60 pounds per square inch gauge, and then the grits were fired into the expansion chamber.

*Example 18*

No. 8/10 corn grits (17 pounds) were treated in the same manner as in Example 1, except that in the cooking and puffing cycles they were steamed to 75 pounds per square inch gauge in 4 minutes, held there for 2 minutes, the steam pressure was quickly reduced to 60 pounds per square inch gauge, and then the grits were fired into the expansion chamber.

*Example 19*

No. 4/5 corn grits (20 pounds) were placed in the steam chamber and steamed to a pressure of 75 pounds per square inch gauge in 4 minutes accompanied by continual purging of the steam, held there for 2 minutes, the pressure was rapidly decreased to 60 pounds per square inch gauge, and then the grits were fired into the expansion chamber which was at a pressure of 0.2 inch of mercury absolute. Evacuation of the expansion chamber was continued during the puff until the grits were cold set.

The vacuum puffed corn grits from Examples 1 to 19 were very satisfactory having the above described characteristics.

Following puffing, the corn grits are preferably dried under the puffing vacuum without re-exposure to air. It is generally desirable to be below the normal equilibrium moisture content of the material. This usually means a drop of about 3% in the drying operation. Drying is preferably accomplished by radiant heat under the vacuum.

Vacuum puffed corn grits may be dried by other means—as by oven drying. Oven drying produces case hardening and some toasting. For some purposes a slight case hardening and toasting are suitable and may be desirable. The case hardening markedly slows down absorption of aqueous liquids.

The present process instantaneously cools the product to a low temperature because of the expansion into a low absolute pressure. This prevents deterioration which would otherwise be caused by the puffing temperature as well as helping to cold set or gel the walls so that they will not collapse upon reimposition of atmospheric conditions.

The foregoing detailed description is given for clearness of understanding only, and no unnecessary limitations should be understood therefrom, as modifications will be obvious to those skilled in the art.

I claim:

1. The method of puffing corn grits which comprises freeing the corn grits from air and replacing the air with an atmosphere of steam, cooking the corn grits for a period sufficient to soften the cell walls and adapt them for puffing, then subjecting the corn grits to a sudden change from a high super-atmospheric pressure to a low sub-atmospheric pressure whereby they are puffed.

2. The method as set forth in claim 1 in which the corn grits are cooked under a pressure of steam of approximately 70 to 100 pounds per square inch gauge.

3. The method as set forth in claim 1 in which the corn grits are cooked under a pressure of steam of approximately 70 to 100 pounds per square inch gauge and the pressure thereon is then adjusted to from about 60 to 100 pounds per square inch gauge, following which the product is immediately puffed.

4. The method as set forth in claim 1 in which the corn grits are cooked for a period of 1 to 11 minutes at a pressure of from about 70 to 100 pounds per square inch gauge.

5. The method of puffing corn which comprises freeing the corn from air and replacing the air with an atmosphere of steam, cooking the corn for a period sufficient to soften the cell walls and adapt them for puffing, then subjecting the corn to a sudden change from a high super-atmospheric pressure to a low sub-atmospheric pressure whereby the corn is puffed.

6. The method which comprises cooking corn grits in an atmosphere of steam, suddenly reducing the pressure below 8 inches of mercury absolute to puff the corn grits, and then drying the puffed corn grits under the sub-atmospheric pressure.

7. The method as set forth in claim 6 in which the drying is accomplished while supplying heat to the corn grits.

8. The method which comprises puffing corn grits by a sudden reduction in pressure in an atmosphere of steam and concluding the operation at an absolute pressure substantially below 8 inches of mercury absolute, and then introducing a volatile liquid at a temperature sufficiently high to have an internal vapor pressure markedly above atmospheric, said mist containing additive flavoring or nutritive ingredients, whereby the liquid explodes into a fine mist and penetrates the food product.

9. In the puffing of corn grits, the steps of heating the grits in the presence of moisture to produce a super-atmospheric steam pressure thereon and then puffing the product into a maintained vacuum sufficiently low to cold set the grits by evaporation of moisture from and consequent cooling of the grits and reimposing atmospheric pressure upon the grits while in cold set condition.

10. The process of claim 9 in which the puffing operation is carried out as a batch process, the puffing being into a vacuum which is initially at substantially absolute zero pressure and which rises during the puffing operation to a point not above an average pressure of 4 inches of mercury absolute.

11. The process of claim 9 in which the puffing operation is carried out as a batch process, the puffing being into a vacuum which is initially at substantially absolute zero pressure and which rises during the puffing operation to a point not above an average pressure of 2 inches of mercury absolute.

12. The method of claim 9 in which the product is dried after the puffing operation is complete but before reimposition of atmospheric pressure.

13. The method of claim 9 in which the temperature of the product is reduced below 100° F.

before reimposition of atmospheric pressure.

14. The method of claim 9 in which the temperature of the product is reduced below 50° F. before reimposition of atmospheric pressure.

15. The method of claim 9 in which the temperature of the product is reduced below 150° F. before reimposition of atmospheric pressure.

16. In the puffing of corn, the steps of heating the corn in the presence of moisture to produce a super-atmospheric steam pressure thereon and then puffing the product into a maintained vacuum sufficiently low to cold set the corn by evaporation of moisture from and consequent cooling of the corn and reimposing atmospheric pressure upon the corn while in cold set condition.

17. A cold set, vacuum puffed, corn grit product produced by the method set forth in claim 9.

18. A cold set, vacuum puffed, corn grain product produced by the method set forth in claim 16.

JOHN M. BAER.

References Cited in the file of this patent

UNITED STATES PATENTS

| Number | Name | Date |
| --- | --- | --- |
| 1,933,158 | Bohn et al. | Oct. 31, 1933 |
| 2,246,528 | Musher | June 24, 1941 |
| 2,261,456 | Warren | Nov. 4, 1941 |
| 2,278,464 | Musher | Apr. 7, 1942 |
| 2,295,116 | Kellogg | Sept. 18, 1942 |
| 2,358,250 | Rogers | Sept. 12, 1944 |
| 2,438,939 | Ozai-Durrani | Apr. 6, 1948 |

FOREIGN PATENTS

| Number | Country | Date |
| --- | --- | --- |
| 494,085 | Great Britain | of 1937 |